(12) United States Patent
Cahuzac

(10) Patent No.: US 6,524,037 B2
(45) Date of Patent: Feb. 25, 2003

(54) PROTECTION DEVICE FOR THE DRIVING AND GUIDING MEANS OF A MOBILE ELEMENT OF A MACHINE TOOL AGAINST PROJECTIONS OF CUTTINGS

(75) Inventor: Daniel Cahuzac, Le Trivalou (FR)

(73) Assignee: Renault Automation Comau, Meuden La Foret Cedex (FR)

( * ) Notice: Subject to any disclaimer, the term of this patent is extended or adjusted under 35 U.S.C. 154(b) by 146 days.

(21) Appl. No.: 09/734,720

(22) Filed: Dec. 13, 2000

(65) Prior Publication Data

US 2001/0004859 A1 Jun. 28, 2001

(30) Foreign Application Priority Data

Dec. 13, 1999 (FR) .......................................... 99 15647

(51) Int. Cl.[7] .......................... B23C 9/00; B23Q 11/08; B24B 55/04
(52) U.S. Cl. .................. 409/134; 451/451; 29/DIG. 56; 29/DIG. 86
(58) Field of Search .......................... 29/27 C, DIG. 56, 29/DIG. 86; 409/134; 408/241 G; 451/451

(56) References Cited

U.S. PATENT DOCUMENTS

| | | | | |
|---|---|---|---|---|
| 3,603,651 A | * | 9/1971 | Weber .......................... | 384/16 |
| 3,669,459 A | * | 6/1972 | Bass ........................ | 277/504 |
| 4,385,539 A | | 5/1983 | Meyerhoefer et al. | |
| 4,565,915 A | * | 1/1986 | Girardin ...................... | 204/206 |
| 5,381,842 A | * | 1/1995 | Aigner ..................... | 144/145.2 |
| 5,607,269 A | * | 3/1997 | Dowd et al. ............ | 29/DIG. 56 |
| 5,688,084 A | | 11/1997 | Fritz et al. | |
| 5,704,884 A | * | 1/1998 | Uemura et al. ............. | 160/116 |
| 5,807,043 A | * | 9/1998 | Blank ......................... | 160/202 |
| 6,082,939 A | * | 7/2000 | Nakashima et al. ........ | 409/134 |
| 6,089,800 A | * | 7/2000 | Tabellini ..................... | 160/202 |
| 6,116,830 A | * | 9/2000 | Azema ........................ | 160/220 |
| 6,120,222 A | * | 9/2000 | Hiramoto et al. ........... | 409/134 |
| 6,260,438 B1 | * | 7/2001 | Tabellini ..................... | 160/202 |
| 6,260,439 B1 | * | 7/2001 | Tabellini et al. ............ | 409/134 |
| 2002/0051687 A1 | * | 5/2002 | Harami et al. .............. | 409/134 |

FOREIGN PATENT DOCUMENTS

CH   436 915 A   6/1966
FR   2 742 519 A   6/1997

OTHER PUBLICATIONS

Plekhanov I.F, "A device for sealing the work chamber in electrochemical machines", Soviet Engineering. Research ( StankI I Instrumenty & Vestnik Mashinostroenia Mashinostrocnie), U.S. Allerton Press, NY vol. 8, No. 6, 1988 pp. 96–98.

* cited by examiner

*Primary Examiner*—A. L. Wellington
*Assistant Examiner*—Brian Walsh
(74) *Attorney, Agent, or Firm*—Sughrue Mion, PLLC

(57) ABSTRACT

A protection device (D) for the driving mechanism of a mobile element (O) against the cuttings of a machine tool includes a driving section (P1) and a machining zone (P2) separated by a protection wall. The protection wall is constituted by a plate (100) having a free translational motion on a disk (200) rotating freely with respect to the wall. A first displacement window (210) in the disk (200), and a second displacement window (310) in the wall are provided wherein both displacement windows (210 and 310) are arranged with respect to each other in such a way that the translational displacement of the plate (100) and the rotation of the disk (200) occlude the opening of both displacement windows (210 and 310).

7 Claims, 2 Drawing Sheets

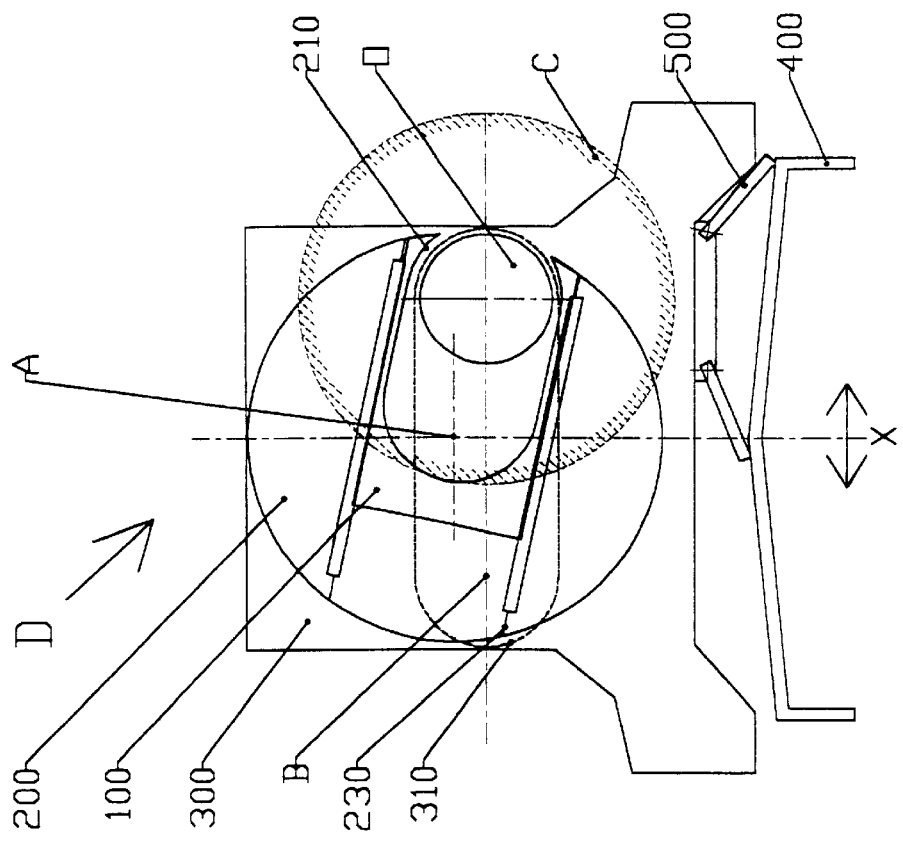
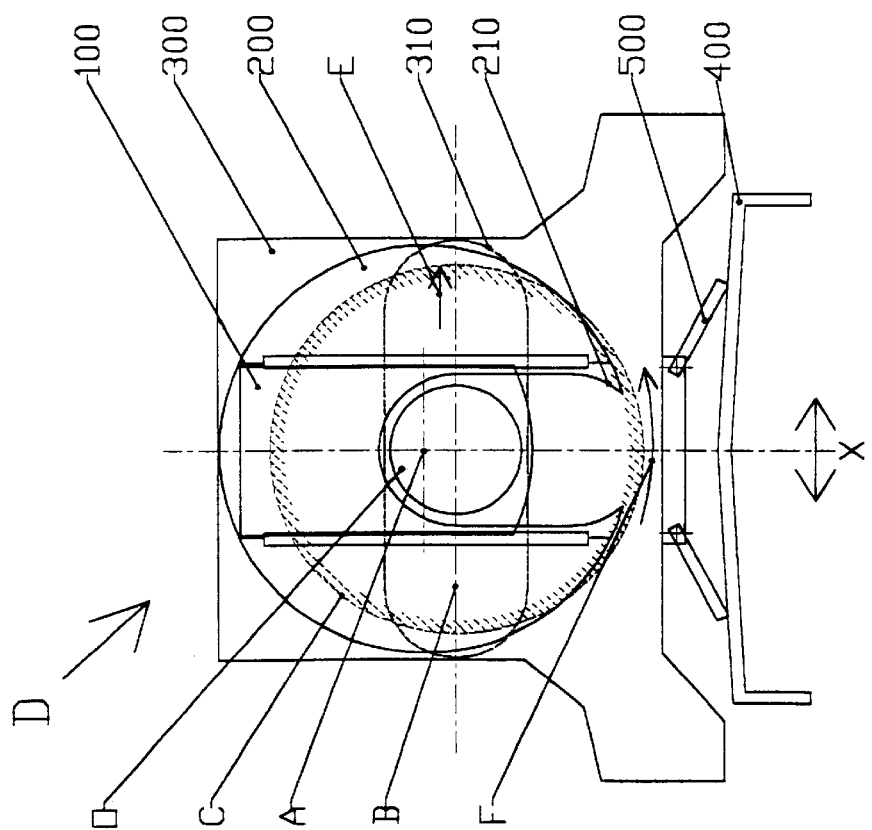

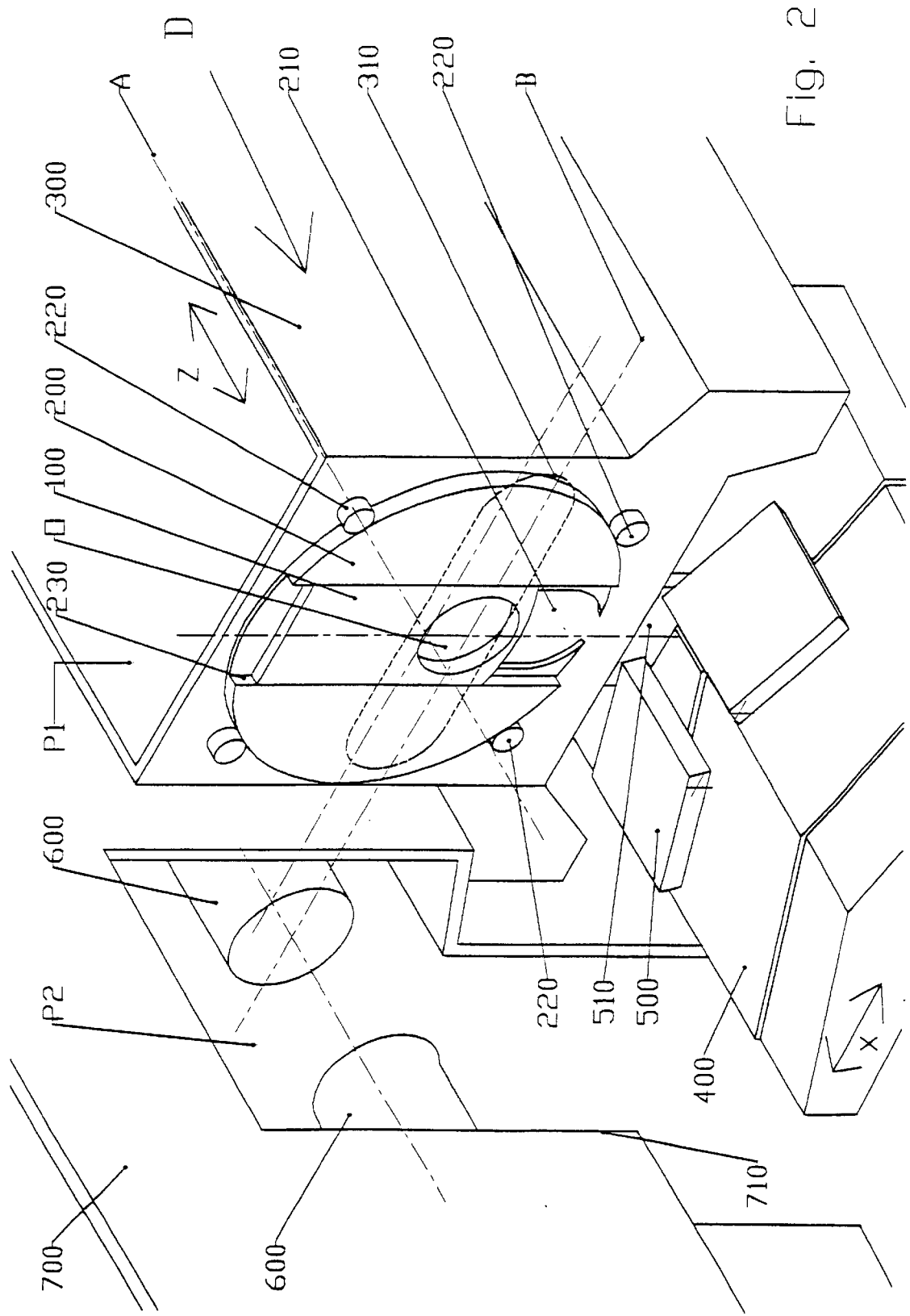

PROTECTION DEVICE FOR THE DRIVING AND GUIDING MEANS OF A MOBILE ELEMENT OF A MACHINE TOOL AGAINST PROJECTIONS OF CUTTINGS

BACKGROUND OF THE INVENTION

1. Field of the Invention

This invention relates to the field of machining machine tools and particularly to the adaptations allowing the driving and guiding means of a mobile element of a machine tool to be protected in the best possible conditions.

2. Discussion of the Background

In the prior art, a plurality of devices and screens are provided in order to ensure against the projection of cuttings caused by any machining operation, whether a turning, milling or grinding operation, etc . . .

The applicant led researches on a protection device against cuttings likely to be adapted on a particular type of machine tools performing the machining of braces. The arrangements of the various parts of said machine, and especially the driving elements of the tools, led to a specification sheet that none of the prior art devices were able to satisfy correctly.

Indeed, the prior art devices, and especially the telescopic devices, feature fixed elements on each side of the zone to be protected, said fixed elements requiring a minimum of space for their mounting.

Likewise, the devices following a mobile element along a displacement axis constituted by a rigid plate coiling and uncoiling around two rolls placed on each side of the mobile element, require a location in order to place said rolls, the dimensions of which may vary.

One of the aims of the invention is to provide a device offering an efficient protection for a minimum space allowance.

The type of machine tools this protection device needs to be adapted to, does not provide the space necessary for the mounting of classical protection devices, because of the fact that until now, the protection against the projection of cuttings as well as their evacuation were provided by jets of cutting oil or other means, that being a technical solution that in the long term would disappear because of the implementation of the new European standards in order to make room for devices taking into account dry machining.

SUMMARY OF THE INVENTION

The researches led by the applicant about a particular application resulted in an original concept of a protection device against the projection of cuttings, said concept being new and creative and allowing:

the protection against the projection of cuttings in optimal conditions;

the respect of the specification sheet as established;

but also its adaptation on any device that requires the protection of the driving and guiding means of its mobile element.

According to the main feature of the invention, the protection device of the driving means of a mobile element against the projection of cuttings of a machining machine tool having a driving section and a machining section, is of the type that defines a protection wall that, being interdependent from the mobile element that goes through it, separates the driving section from the machining section.

This device is noticeable because of the fact that it is constituted by a plate interdependent from the crossing part of the mobile element and moving in a free translation on a freely rotating disk with respect to a cabin, and the rotation axis of said disk is shifted with respect to the displacement axis of said mobile element for which a first displacement window is arranged in the disk and a second displacement window is arranged in the cabin. These two displacement windows are placed with respect to each other in such a manner that the displacement of the mobile element in said second window along a plane perpendicular to the rotation axis of the disk simultaneously causes the sliding of said plate on the disk as well as the rotation of said disk, so that said translational displacement of the plate and the rotation of the disk occlude the opening of the two displacement windows.

The use of a disk is particularly advantageous in that it avoids the necessity to have a displacement area for the protection screen on each side of the real surface to be protected, as for instance the telescopic devices requiring a fixed part or at least a minimum fixed width allowing the arrangement of a mobile element of the telescopic structure. It is also the case with the plates coiling or uncoiling around the rolls on each side of the zone to protect. The geometry of the circle is thus particularly advantageous with respect to the space required for such a protection device. Therefore, said protection device can be adapted to devices or machine tools for which no necessary space was provided, in the original concept, for the mounting of a protection device against the projection of cuttings, all the while offering an optimal protection device allowing the motions of the mobile element going through it and driving its different components.

Another advantage linked to such a device consists in the simplicity not only of its kinematics but also of the various elements comprising it, which allows to contemplate a low cost embodiment, which is the applicant's constant concern.

Indeed, the implemented kinematics in such a device is provided by a slide-link moving on a plane in a pivot-link. No additional drive is required as the motions of the plate and disk are provided by the motions of the mobile element in a plane perpendicular to the rotation axis of the disk, the plate and the disk moving freely.

The elements comprising the protection device are reduced to the minimum, due to the fact of the very simplicity of the implemented concept. The displacement window arranged in the cabin must be occluded by the disk and the plate sliding above, and the displacement window arranged in the disk must be occluded by the plate interdependent with said mobile element that goes through said plate.

The mobile element of which the driving and guiding means or any other constitutive means of a machine tool sensitive to cuttings projection can be constituted of course by a tool holder—slide or a tightening module for a subject piece, among others.

The fundamental concepts of the invention having been put forth hereabove in their most elementary form, other details and features will be brought out through the reading of the following description, giving as way of a non limiting example and in view of the attached drawings, an embodiment of a protection device of the driving and guiding means of a mobile element of a machining machine tool against the projection of cuttings corresponding to the invention.

BRIEF DESCRIPTION OF THE DRAWINGS

FIG. 1a represents a front schematic view of a protection device according to the invention.

FIG. 1b represents a front schematic view of the protection device of FIG. 1a displaying the mobile element at the end of its travel.

FIG. 2 represents a global schematic view in an isometric perspective of the protection device.

DETAILED DESCRIPTION OF THE EMBODIMENTS

Such as shown on the drawing of FIG. 2, the protection device with reference D in its whole protects the driving and guiding means of a mobile element O placed in a part called driving section P1 against the projection of cuttings of a machining machine tool. The mobile element O comprises, driven in rotation at its end, a tool (not shown) that ensures the machining operations in a part called machining section P2. As shown, the protection device D is of the type that defines a protection wall that, being interdependent from the mobile element O that goes through it, separates the driving section P1 from the machining section P2.

In the shown and preferred embodiment, the mobile element O is constituted by a tool holder—slide that goes through said protection device D. Said protection device D is advantageously constituted by a plate 100 interdependent with the crossing through part of the mobile element O and moving in free translation on a disk 200 rotating freely with respect to a cabin 300 and the rotation axis A of which is shifted with respect to the displacement axis B of said mobile element O, for which the following elements are arranged:

a first displacement window 210 in the disk 200, and a second displacement window 310 in the cabin 300, the two displacement windows 210 and 310 being placed with respect to each other in such a manner that the displacement of the mobile element O in said second window 310, according to a plane perpendicular to the rotation axis A of the disk 200, unilaterally causes the sliding of said plate 100 on the disk 200 as well as the rotation of said disk, so that said translational displacement of the plate 100 and the rotation of the disk 200 conclude the opening of both displacement windows 210 and 310.

The operation and motion of the pieces comprising said protection device D, with respect to each other, is shown in a more detailed manner in the drawings of FIGS. 1a and 1b.

As shown in FIG. 1a, the protection device D adopts a starting position in which the symmetry axis of the plate 100 is perpendicular to the symmetry axis of the displacement window 310 of the mobile element O at the end of which a rotating tool C is driven. This starting position allows the mobile element O to move along the displacement window 310 arranged in the cabin 300 on each side of said symmetry axis of the plate 100 by setting into motion said plate 100 along the groove provided to that effect and arranged in the disk 200, said translational motion ensuring the rotation of said disk 200 by reason of the shift between the displacement axis of the mobile element O perpendicular to the rotation axis of said disk 200 and said rotation axis of the disk 200.

As shown in the drawings of FIGS. 1a and 1b, the translation of the mobile element O indicated by arrow E, and at the end of said mobile element O is found a tool C being driven by rotation inside a displacement window 310 from a position located in the centre of said displacement window to a position according to arrow E located at the far right of the displacement window 310, causes the translation of the plate 100 on the disk 200 as well as the rotation of said disk 200 according to arrow F.

The stacking, arrangement and sizes of the various vertical walls of the plate 100 of the disk 200 and of the cabin 300 with respect to the displacement windows 210 and 310 are such that, as shown in its intermediate position in the drawing of FIG. 1a, the part of the displacement window 210 arranged in the disk 200 not recovered by the plate 100 is occluded by the vertical surface of the cabin 300. Likewise and always in that position, the displacement window 310 arranged in the cabin 300 is recovered by the disk 200 on its ends and by the plate 100, through which goes the mobile element O, on its central portion.

As shown in the drawing of FIG. 1a, the displacement of the mobile element O along arrow E causes the sliding of the plate 100 and the rotation of the disk 200, which allows the closing of the openings 210 and 310 created with respect to the starting position shown in the drawing of FIG. 1a in the windows 310 and 210.

According to a particularly advantageous embodiment that is shown in a more detailed manner in the drawing of FIG. 2, the aforesaid disk 200 is guided in rotation by means of rollers 220, the rotation axis of which are parallel to the rotation axis of said disk 200 and interdependent from the cabin 300. This technological solution is particularly simple for the setting of a pivot link of said disk 200. Although the drawing shows the presence of four guiding rollers 220 in rotation, the applicant does not want to limit himself as to the number of rollers used for such an application.

Said disk 200 is provided with a groove 230 having a width that allows the reception of the plate 100, the sides of said groove 230 guiding the plate 100, said disk 200 comprising means that provide the support of said plate 100 within said groove 230, the diameter of said disk 200 defining the limits of travel of the plate 100.

According to a preferred but non-limiting embodiment, the device D is noticeable in that the ensemble constituted by the mobile element O and the protection device D are kinematically interdependent along a first displacement axis Z. Always according to this embodiment, the device D is noticeable in that only the mobile element O moves along the second displacement axis X with respect to the cabin 300 driving through this motion the protection device D.

According to the shown preferred embodiment, the guiding means of the ensemble constituted by the mobile element O and the protection device D are protected by a telescopic structure 400 having the shape of a roof, the ridge of which is parallel to the displacement axis of said ensemble.

According to a particularly advantageous feature of the invention, at least one scraping module 500 providing the evacuation of the cuttings deposited on the telescopic structure 400 is linked to the translational displacement motion of the ensemble of the protection device D according to the Z axis, so that the cuttings are carried away on the slopes of the roof shaped telescopic structure 400.

According to the shown preferred but non-limiting embodiment, said device D is noticeable in that it comprises two scraping modules 500 placed on each side of the symmetry plane going through the ridge of said telescopic structure 400 having the shape of a roof, and a first end of which is in contact with said structure 400 and a second end of which is mounted in a rotating manner with respect to a top plate 510 attached to the mobile element O, so that the weight of each scraping module 500 provides a permanent contact between said scraping module and the slope of the roof shaped telescopic structure on the side of which it is located, in such a way that the scraping module 500 is adapted to the slop of the roof shaped telescopic structure 400 whatever the travel of the mobile element O and/or the ensemble constituted by the mobile element O with the protection device D may be, said travel allowing the evolution of the telescopic structure 400 by providing a translation according to the X axis.

This feature is shown in the drawings of FIGS. 1a and 1b, in which both scrapping modules 500 rotating at one of their ends with respect to a top plate 510 move along the displacement arrow E with the mobile element O. As shown in the drawing FIG. 1b, because of their pivot link, both scraping elements 500 remain in contact with the slopes of the roof shaped telescopic structure 400 so that their ends carry away the cuttings fallen on said slopes towards the cuttings recuperation zones towards which said slopes are oriented. Thus, the applicant advantageously associated one of the motions of the mobile element O with modules allowing the cleaning of the protection device of the guiding elements corresponding to a motion perpendicular to said motion of the mobile element.

According to a particular application, the protection device protects the guiding and driving elements of a machining station of the type that comprises at least one tool C holder—mobile element O moving on two perpendicular axis (Z and X) and located between two stations holding the subject piece providing the rotational drive and/or the retention of two pieces placed in parallel before and after the mobile element O, so that the tool C driven in rotation by the mobile element O follows a back-and-forth translational motion (X axis) of a piece holder—station to another piece holder—station. The drawing of FIG. 2 shows one of these working stations that comprises here two tool holder—mandrels 600.

In this specific application, the protection device D of the driving elements of the mobile element O is noticeable in that said cabin 300 mobile along the Z axis is associated, for each working station, to fixed vertical and transversal separation walls 700 comprising a machining window 710 through which the tool C driven in rotation at the end of the mobile element O comes into contact with the subject piece.

Moreover, the shapes of the contact walls between the cabin 300 and the separation wall(s) 700 adapt themselves so that there is a minimum clearance during the motion of the cabin along the Z axis. Indeed, the machining window 710 placed in the separation wall 700 opens into the machining section P2 and it is particularly important that the clearance between the various walls in contact is minimal, in order to avoid, as much as possible, that the cuttings coming from the machining put themselves between the walls placed opposite each other.

According to another specific application that is not shown, the machining machine tool comprises a second tool holder—mobile element opposite the first one, in order to perform the machining operations on the same working station or on a different working station. This new mobile element is advantageously provided with a protection device corresponding to the invention and its cabin comes into contact with said vertical separation walls.

As shown, due to space and access considerations, the separation walls 700 adopt a particular profile in the shape of an elbow under the mandrels 600. The shape of this elbow is also taken by the contact wall of the cabin 300 with the separation wall 700, so as to minimise as much as possible the space allowing the displacement of the ensemble formed by the protection device D with the mobile element O along the Z axis between the two separation walls 700.

Moreover, the applicant uses this feature in order that, during its displacement along the Z axis, the cabin 300 of the protection device D closes the machining window 710 placed in the separation wall 700.

According to another particularly advantageous feature of the invention, the volume defined by the bottom wall constituted by the telescopic structure 400 and by both separation walls 700 and at least one cabin 300 sliding on both separation walls 700 is not provided with a wall for a roof. This feature allows to keep the possibility to change the tool C through the top of the machine tool adopting two working stations on each side of one or two mobile elements with a tool C driven in rotation at their end.

It is understood that the protection device just described and shown hereabove was described and shown in view of publication rather than limitation. Of course, various arrangements, modifications and improvements may be brought to the above mentioned example without going beyond the scope of the invention taken in its largest aspects and spirit.

Thus, for instance, the cabin may adopt a superior shoulder that, all the while providing for the possibility of changing the tool C through the top, will allow to protect the kinematic ensemble formed by the disk 200 with the plate 100 sliding above it from the projection of cuttings.

What is claimed is:

1. A protection device for protecting driving elements of a mobile element from cuttings produced by a machine tool having a driving section and a machining zone with a protection wall separating the driving section from the machining section, a protection device comprising a cabin, a first displacement window in the disk and a second displacement window in the cabin, a plate interdependent from a cross-through portion of the mobile element slidably mounted on the disk for free translational motion relative to the disk, both displacement windows being arranged with respect to each other so that displacement of the mobile element in said second window in a plane perpendicular to a rotation axis of the disk simultaneously causes sliding of said plate on the disk and the rotation of the disk so that said translational displacement of the plate and the rotation of the disk occlude an opening defined by both displacement windows.

2. A protection device a set forth in claim 1 wherein said disk is supported for rotation by means of rollers supported on said cabin with an axis of rotation of each roller parallel to the rotation axis of said disk.

3. A protection device as set forth in claim 1 wherein said disk is provided with a transverse groove in one surface thereof having a width for receiving and guiding said plate in said groove.

4. A protection device as set forth in claim 1 wherein said mobile element is movable along a first axis and a second axis said mobile element and the protection device are kinematically interdependent for movement along said first axis and only said mobile element is movable along the second axis with respect to said cabin thereby driving the protection device.

5. A protection device as set forth in claim 4 wherein guiding means of said mobile element and a protection device are protected by a telescopic structure having a roof shape with a ridge parallel to the axis of the mobile element and the protection device.

6. A protection device as set forth in claim 5 further comprising at least one scraping module for removing cuttings deposited on the telescopic structure, said scraping module being linked to translational displacement motion of said mobile element and perpendicular to translational motions of the mobile element and the protection device so as to carry away cuttings deposited on said telescopic structure.

7. A protection device as set forth in claim 6 further comprising a second scraping module, said scraping modules each being pivoted at one end to a top plate fixed to said mobile element on opposite sides of a symmetry plane extending through said ridge of a telescopic structure, said scraping modules each having a second end disposed in contact with said telescopic structure for engagement with said telescopic structure due to gravity upon movement of said top plate relative to said telescopic structure.

* * * * *